US006973655B2

(12) United States Patent
Jacquin et al.

(10) Patent No.: US 6,973,655 B2
(45) Date of Patent: Dec. 6, 2005

(54) SYSTEM AND METHOD OF INTEGRATING SOFTWARE COMPONENTS

(75) Inventors: Thierry Jacquin, Gieres (FR); Michel Gastaldo, Montbonnot (FR)

(73) Assignee: Xerox Corporation, Stamford, CT (US)

( * ) Notice: Subject to any disclaimer, the term of this patent is extended or adjusted under 35 U.S.C. 154(b) by 622 days.

(21) Appl. No.: 10/017,600

(22) Filed: Dec. 18, 2001

(65) Prior Publication Data

US 2003/0115370 A1 Jun. 19, 2003

(51) Int. Cl.[7] .............................................. G06F 9/46
(52) U.S. Cl. .................................................... 719/310
(58) Field of Search ................................ 719/328, 331, 719/332, 320, 310; 717/113, 109, 105, 100; 345/762, 760; 709/219, 223; 715/513

(56) References Cited

U.S. PATENT DOCUMENTS

| | | | | |
|---|---|---|---|---|
| 5,386,568 A | * | 1/1995 | Wold et al. ................. | 717/162 |
| 5,448,739 A | * | 9/1995 | Jacobson ..................... | 719/320 |
| 5,485,617 A | * | 1/1996 | Stutz et al. .................. | 719/315 |
| 5,579,469 A | * | 11/1996 | Pike ........................... | 715/781 |
| 5,761,684 A | * | 6/1998 | Gibson ........................ | 715/515 |
| 5,794,006 A | * | 8/1998 | Sanderman .................. | 709/223 |
| 5,848,291 A | * | 12/1998 | Milne et al. ............. | 715/500.1 |
| 5,867,651 A | * | 2/1999 | Dan et al. .................... | 709/203 |
| 6,012,098 A | * | 1/2000 | Bayeh et al. ................ | 709/246 |
| 6,133,915 A | * | 10/2000 | Arcuri et al. ................ | 715/779 |
| 6,211,874 B1 | * | 4/2001 | Himmel et al. ............. | 715/781 |
| 6,237,030 B1 | * | 5/2001 | Adams et al. .............. | 709/218 |
| 6,421,716 B1 | * | 7/2002 | Eldridge et al. ............. | 709/219 |
| 6,437,805 B1 | * | 8/2002 | Sojoodi et al. .............. | 715/763 |
| 6,438,615 B1 | * | 8/2002 | Faustini ....................... | 719/315 |
| 6,516,349 B1 | * | 2/2003 | Lieberman ................... | 709/225 |
| 6,643,708 B1 | * | 11/2003 | Francis et al. .............. | 709/246 |
| 6,681,386 B1 | * | 1/2004 | Amin et al. ................. | 717/136 |
| 6,738,964 B1 | * | 5/2004 | Zink et al. ................... | 717/105 |

OTHER PUBLICATIONS

L. Carr, et al, "Link Services or Link Agents ?", ACM, 1998, pp. 113-122.*

* cited by examiner

Primary Examiner—Sue Lao
(74) Attorney, Agent, or Firm—Jeannette M Walder

(57) ABSTRACT

A system for integrating services in a system includes a plurality of services, wherein each service includes a software component associated with the system and provides at least one functionality. A user interface, such as a web browser, displays the plurality of services, wherein each service has a link associated with it for accessing the service directly. A scripting shell, responsive to selection of a first service and a second service from the plurality of services, pipes the first and second services together to form a scenario such that output from the first service is provided as input to the second service. A link may be associated with scenario for accessing the scenario directly.

10 Claims, 16 Drawing Seets

| | | |
|---|---|---|
| Mail Sender | Various Kasba Facilities | PdfConverter |
| Search engine on /computer/ ZDNet | Search engine on / france/ AlloCiné | Search engine on / general/ Google |
| Search engine on / general/ OpenDirectory | Html Document Editor | Document Souls Vizualizer |
| Web Assistant | DocuShare on docushare.grenoble.xrce.xerox.com | DocuShare on lautaret.grenoble.xrce.xerox.com:1707 |
| Terms extraction with strategies | Document Language Identifier | Terms Extractor |
| Knowledge Pump Communities | Image Composer | Knowledge Profiling |
| Dictionary | Image Extractor | Knowledge Profile Repository |
| SearchNRank | Document Categorizer | Document Summarizer |

*FIG. 2*

| Service properties (Mail Sender) | |
|---|---|
| Name | Emailer |
| Vendor | javamail1.2 mailer plugged by Loic Lavy (Loic.Lavy@xrce.xerox.com) |
| Manufacturer | Sun |
| Model | Emailer |
| SerialNumber | $Id: JavamailCoreImpl.java,v 1.4 2001/07/03 07:06:22 jacquin Exp $ |
| Version | $Id: JavamailEmailerTask.java,v 1.4 2001/03/30 07:17:58 llavy Exp $ |
| Domain | email |
| Domain | scenario |
| Domain | javamail |
| Address | XRCE/ATS 38240, Meylan France |
| Location | cerise.grenoble.xrce.xerox.com Third Floor Castle |
| Comment | The Javamail instance of the emailer service over JSF furnishes a way to email Kasba scenarios |
| Interact with Emailer | |

FIG. 6

| Service parameters description (Javamail Emailer instance of Emailer) | | |
|---|---|---|
| Name | Description | Type |
| cmd | the command the service can Handle<br>0 send an email | Integer |
| sender | The sender's email address<br>mandatory | String |
| to | The "to" (primary) recipients.<br>Separate email address by ',' or '.'<br>mandatory | String |
| cc | The "cc" (carbon copy) recipients.<br>Separate email address by "," or "." | String |
| bcc | The "bcc" (blind carbon copy) recipients.<br>Separate email address by ',' or '.' | String |
| subject | The subject of the email | String |
| pre-body | The pre-body of the message | String |
| body | The body of the message | String |
| post-body | The post-body of the message | String |
| attachment | The attachment file to send with the message<br>Several files can be specified by separating them by ',' or '.' | String |

FIG. 7

| Service parameters description (Xelda instance of Dictionary) ||| 
|---|---|---|
| Name | Description | Type |
| cmd | the command the service can Handle<br>0 lookup in a dictionary each word of a text<br>1 hyperlinks each word of a text towards its translation<br>(input-url \| input-text) [output-language] [input-language] [output-format] | Integer |
| input-url | The url to parse and lookup | String |
| input-text | The text to parse and lookup | String |
| input-language | The language in entry, default is english | String |
| output-language | The language in output, default is english | String |
| output-format | The output format, only for lookup command default is html, can be ascii | String |

*FIG. 10*

Service properties (Dictionary)

| | |
|---|---|
| Name | Dictionary |
| Vendor | Alain (drums, not guitar) Franciosa (Alain.Franciosa@xrce.xerox.com) |
| Manufacturer | Xerox |
| Model | Xelda |
| SerialNumber | $Id: XeldaCoreImpl.java,v 1.2 2001/09/28 12:19:19 jacquin Exp $ |
| Version | $Id: XeldaDictionaryTask.java,v 1.1 2001/09/22 15:15:54 jacquin Exp $ |
| Address | XRCE/ATS 38240, Meylan France |
| Location | cerisc.grenoble.xrce.xerox.com Third Floor Castle |
| Domain | dictionary |
| Domain | dictionary, linguistics, xelda, english, french, italian, portuguese, german |
| Comment | The dictionary is able to provide you word definitions in the same or different languages. french and english languages are able to interopate with all the others and have to be considered in one of the input-language or output-language<br>BE CAREFUL, very expensive service when too many words in input |

Interact with Xelda

*FIG. 11*

| | |
|---|---|
| Service properties (Document Summarizer) | |
| Name | Summarizer |
| Vendor | Greg (Gregory.Grefenstette@xrce.xerox.com) |
| Manufacturer | Xerox |
| Model | ShellMltt |
| SerialNumber | $Id: ShellMlttCoreImpl.java,v 1.4 2001/07/24 13:22:19 jacquin Exp $ |
| Version | $Id: ShellMlttSummarizerTask.java,v 1.3 2001/02/09 14:57:50 jacquin Exp $ |
| Address | XRCE/ATS 38240, Meylan France |
| Domain | linguistics |
| Domain | english, french, german, spanish, italian, portuguese |
| Location | cerise.grenoble.xrce.xerox.com Third Floor Castle |
| Comment | The ShellMltt instance of the Summarizer service over JSF can handle a text, an url or a file. for a file, be careful: the path should be valid on cafeiere.grenoble.xrce.xerox.com machine for the jacquin user. |
| Interact with ShellMltt | |

FIG. 14

Service parameters description (ShellMltt instance of Summarizer)

| Name | Description | Type |
|---|---|---|
| cmd | the command the service can Handle no choice. Only 0 cmd to summarize (input-file \| input-text \| input-url) [language] | Integer |
| language | The language of the source text can be within:<br>english, the default value<br>french<br>spanish<br>german<br>italian<br>portuguese | String |
| input-file | The source text if a file | String |
| input-url | The source text if a url | String |
| input-text | The source text if a string | String |

FIG. 15

SYSTEM AND METHOD OF INTEGRATING SOFTWARE COMPONENTS

BACKGROUND OF THE INVENTION

This invention relates generally to systems and methods for providing software services, and more particularly, to a system and method of integrating and customizing software components using a user interface such as a browser.

Numerous software products providing a variety of functionalities are available for users to purchase and use. Despite the abundance of software products available, many users must customize their software installations in order to meet their particular requirements. Other users are unable to find a complete solution to their particular requirements in any single software product and try to integrate several existing software packages to achieve the desired functionality. Even if a user is able to integrate several software packages together, the cost may be greater than the customer's budget permits. Also, all of the software functionalities in each of the software products may not be used, further exacerbating the cost issue.

Even users who purchase only a single software component frequently use only a fraction of the software package's functionalities. This is less problematic to the user if the software package is modestly priced. However, if the software package is expensive (based on the user's budget), the user will be less inclined to purchase the package. Some vendors, in recognition of this problem, offer software on a shared basis. For example, a complete software package may be loaded on a server located on a network, such as the Internet, and users given access to the package. The user would then be billed on the basis of the number of software functionalities used and the time logged into the server.

Knowledge management customer requirements, in particular, often do not correspond to existing software packages. Knowledge management, by its very nature, has fluid requirements. Seldom does a single software package meet the knowledge management customer's requirements, and if so, not for long. The only economically viable approach is for the knowledge management customer to integrate several components to form a dedicated solution corresponding to the desired solution.

One of the big difficulties for web portal designers is keeping new and up-to-date functionalities on their portals. Portals are static from the final user's point of view, in the sense that they offer a limited number of functions that are often not renewed for months. Updating data is relatively straightforward. However, keeping up with the latest revisions to software components (such as plug-ins) or new ones being created (such as for multimedia, security, encryption, generation of forms for billing, etc.) is often problematic.

Several systems have been implemented in an attempt to solve these problems for users. For example, Hewlett-Packard's e-speak is one particular instance of a distributed components architecture using CORBA (Common Object Request Broker Architecture developed by an industry consortium known as the Object Management Group). CORBA is an architecture that enables pieces of programs, called objects, to communicate with one another regardless of what programming language they were written in or what operating system they are running on. e-speak offers web-access from a browser for registration and discovery of services, and for interaction through a dedicated client and an edited XML document. Registered services cannot be accessed directly through the web-access, but only through registered servlets. e-speak provides users with a means to discover services, with a user-level consideration of the description/discovery language. e-speak also offers an easy service registration for external services that can only be accessed using a servlet, i.e., with an http interface.

Another system is an internal product development project by Xerox the Enterprise Output Management (EOM) Solutions Platform for constructing solutions that manage the execution of output jobs directed to a collection of output facilities in an enterprise. The collection of output facilities can include any combination of local printers, viewers, Web publishers, archives, FAX machines, CD-ROM writers, EDI drivers, or remote print submission services (among others). A major element of the EOM Solutions Platform is an Integration Framework called DSDIF ("Document Systems Domain Integration Framework"). A framework, in an object-oriented system, is a set of classes that embodies an abstract design for solutions to a number of related problems. DSDIF enables components and services belonging to the EOM Solutions Platform to be integrated with each other into an overall solution. This allows many customized solutions to be obtained, with minimal implementation effort, from a common set of services and components.

There is a need for a system and method of integrating and customizing software components easily in a minimum amount of time. There is also a need for a system and method which employs a convenient user interface such as a browser. There is a further need for a system and method which provides users with the ability to implement their own scenarios involving a set of software components.

SUMMARY OF THE INVENTION

A system for integrating services in a system, according to the invention, includes a plurality of services, wherein each service comprises a software component associated with the system and provides at least one functionality. A user interface, such as a web browser, displays the plurality of services, wherein each service has a link associated with it for accessing the service directly. A scripting shell, responsive to selection of a first service and a second service from the plurality of services, pipes the first and second services together to form a scenario such that output from the first service is provided as input to the second service. A link may be associated with scenario for accessing the scenario directly. A method of integrating services in a system, according to the invention, includes providing a plurality of services in a user interface, selecting a first service from the plurality of services, selecting a second service from the plurality of services, and piping the first and second services together to form a scenario such that output from the first service is provided as input to the second service.

A scenario may be any number of services piped or chained together. In one embodiment, the services are chained together such that the output of one service is applied to the input of the next. For example, if a scenario includes services A and B, the output of A is provided to the input of B (alternatively, the input of B may also include additional input). If the user wishes to add a third service to the scenario, the user may choose, for example, as input of C, to provide: the output of A, the output of B, or the output of A and B. When the user is satisfied with the configuration of the final scenario, the system can establish a link to the scenario directly. Thus, the scenario now appears to be a "single" service, a black box, with input and outputs.

In another aspect of the invention, a method of accessing a service in a system, includes providing a plurality of services, wherein each service comprises a software component associated with the system and provides at least one functionality; displaying the plurality of services in a browser, wherein each service has an http link associated with it for accessing the service directly; selecting a service from the plurality of services; and accessing the service from the user interface.

To assist a user in selecting from a large number of services in the system, a filter control may be used to enable the user to select among a plurality of selectable criteria, wherein the criteria refer to conditions defined for each of the services. Responsive to selection of at least one criteria in the filter control, the filter control generates any results and the user interface displays the results, wherein the results comprise a subset of the plurality of services. The user can then use the scripting shell to pipe selections from the results together.

The system may be used to locate services, experiment with a selected service, design a scenario (a set of services piped together), validate and save the scenario. The system and method of integrating services can be used as a display shelf for software technologies, allowing users to discover, test and demonstrate combinations of the individual services. The system and method may be used as a tool to interactively design software; it may be used as a dynamic portal to build services on demand.

The user interface may be a web browser, but other types of interfaces may also be used. A browser is generally a program which allows a person to read hypertext and provides some means of viewing the contents of nodes (or pages) and of navigating from one node to another. When the user interface is a web browser, the system offers an intuitive way of selecting services and indicating which data have to be considered as input and output. The system takes services, which are software components, and documents and registers them in the system. The web browser displays the services in a web page. The services may be remotely located and may be invoked via an http interface. The system enables the creation, testing and validation of scenarios, which are an association of a set of services, with data transferred between services. A scenario can be seen as a customized software application involving several services.

Services may be written in any description language, for example, Java or a Java interface. Using a language such as Java makes documentation and registration of services in the system relatively straightforward; the only effort involved in adding a service generally consists of documenting the service and writing a main function for the service invocation. Additionally, the output of a service may be structured or it may be treated as a string. For example, a "wizard" has been developed for an example system known as "Kasba." The Kasba Wizard allows users to plug in a new service to the Kasba system in less than an hour by following a series of prompts and inputting in requested information.

The system and method of integrating services may be used in many different applications. For example, a user can build his/her own service, putting together (composing) existing services, for example on a web portal. The system and method of integrating services may be used by a software developer to quickly design and implement a scenario involving several software components. A solution designer/integrator could use the system and method of integrating components in order to: evaluate a component in a targeted context by replacing one component for another; test the new component in the targeted context; understand the transfer of data between the components; predict problems in terms of volume of exchanged data; and identify where the data needed is not available, etc., to find the right sequence of components and quickly design a dedicated scenario for a given situation, e.g., customized for a given presentation.

The system and method of integrating services may be used to solve knowledge management requirements. In the area of knowledge management, data is often poorly structured and typed (very often the data is represented only as a string) and often the data is very heterogeneous (requiring the manipulation of entities of very different nature), and the interpretation of the data is not unique and depends on the context. The knowledge management user plays a role in the analysis of knowledge data by the selection and combination of data. The system and method of integrating services gives the user an opportunity to specify and easily implement the selection and treatment of the knowledge data.

The system and method of integrating services makes the creation of scenarios quick and easy. Scenario designers can quickly identifying missing and/or important components. This aspect is useful to the designer, because identifying the value of some components is often only possible when used in combination with other components; many software components cannot be evaluated in isolation. By using the system and method of integrating services, the user may make the decision to buy a software component after having seen it working in some scenarios (possibly by purchasing a limited evaluation license, which is enough to plug the component into the system). In this way, the ultimate user has an opportunity to evaluate the components before making the decision, and limits the user's a priori investment.

BRIEF DESCRIPTION OF THE DRAWINGS

FIG. 2 is a display of a group of services available in a system for integrating software components;

FIG. 6 is a list of service properties for an emailer service;

FIG. 7 is a list of service parameters for an emailer service;

FIG. 10 is a list of service properties for a dictionary service;

FIG. 11 is a list of service parameters for a dictionary service;

FIG. 14 is a list of service properties for a summarizer service;

FIG. 15 is a list of service parameters for a summarizer service;

DETAILED DESCRIPTION OF THE EMBODIMENTS

Figure 1:
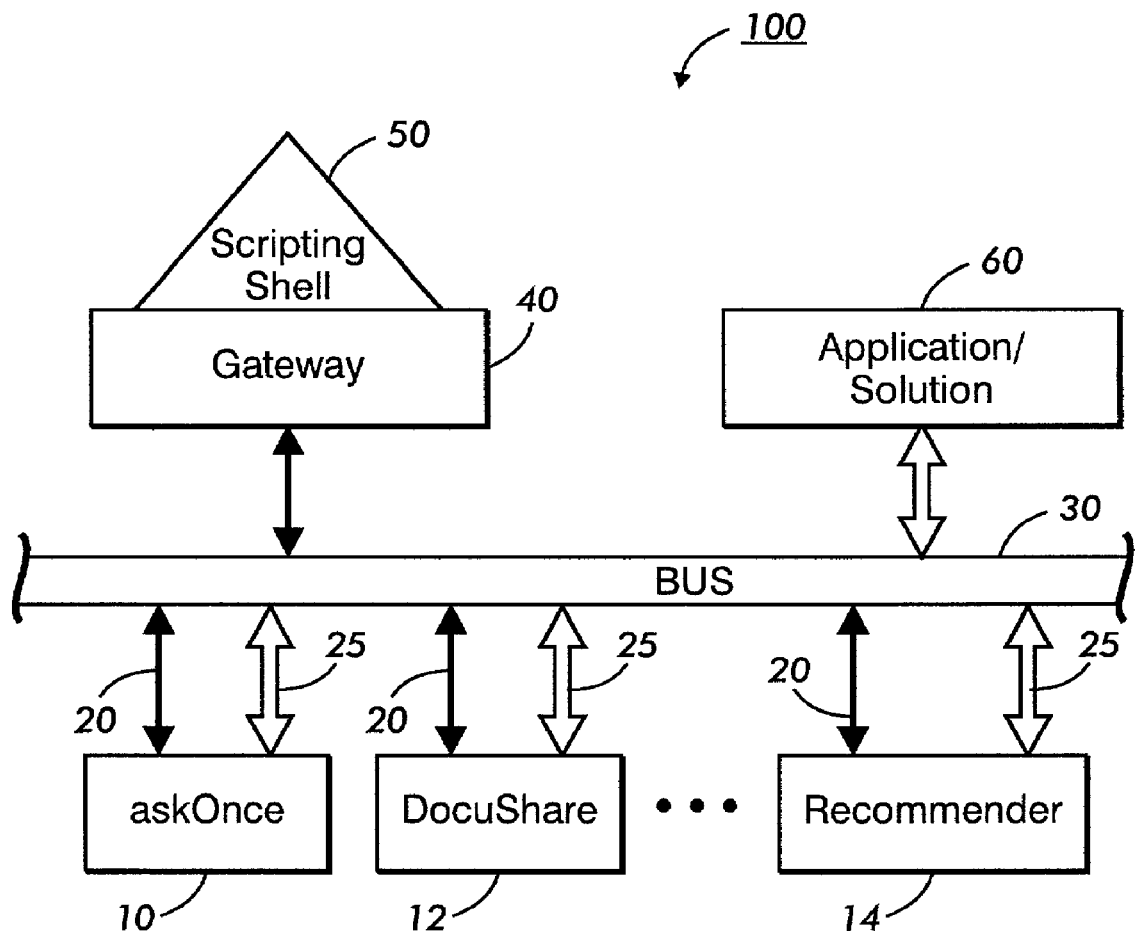
FIG. 1 is a block diagram of a system for integrating software components.

The invention may be implemented in numerous environments. For convenience, the invention will be described with more particularity with regard to an implementation in the area of knowledge management. Referring to FIG. 1, a block diagram of a system for integrating services is shown and referred to by reference numeral 100. System 100 includes a plurality of services 10, 12, 14, a framework 20, an http-Gateway 40 and a scripting shell 50. System 100 communicates over a network using a bus 30. System 100 includes a plurality of services 10, 12, 14. Service 10 is a search engine product called askOnce; service 12 is a Docushare database account; service 14 is a recommender service. Each service is connected or plugged into a bus 30 (which may be for example a Jini bus) 30 using frameworks 20.

System 100 relies, for its infrastructure in order to connect to a network (which may be an internet, the Internet or an intranet), on an existing platform (or bus). For this embodiment Jini has been chosen, but many other buses or platforms could be used to plug-in the services. On top of the bus 30, the gateway 40 supports discovery and activation of the services 10, 12, 14 and the interactions with the services conforming to the framework 20. Gateway 40 enables users to activate an individual service directly. Scripting shell 50 provides the scenario scripting, i.e., the creation of an integration of services according to some user input (script, store, replay, share, publish as template) into a scenario. Services 10, 12, 14 can be integrated on the same bus 30 using another framework 25 and applications 60 can involve the same services outside system 100, either relying on framework 20 or any other existing framework 25.

In this embodiment, the bus 30 is a Jini bus (software from Sun Microsystems that simplifies the connection and sharing of devices, such as printers and disk drives, on a network) and the software components are written in Java or have a Java interface. Also in this embodiment the http gateway 40 provides a direct path from the user interface (here the web browser) to the software components 10, 12, 14. Shell 50 and framework 20 are written in Java. The Java introspection mechanisms provide a convenient method of understanding the input and output parameters between software components and provide support to transform the output of one component into the input of another.

Figure 4:
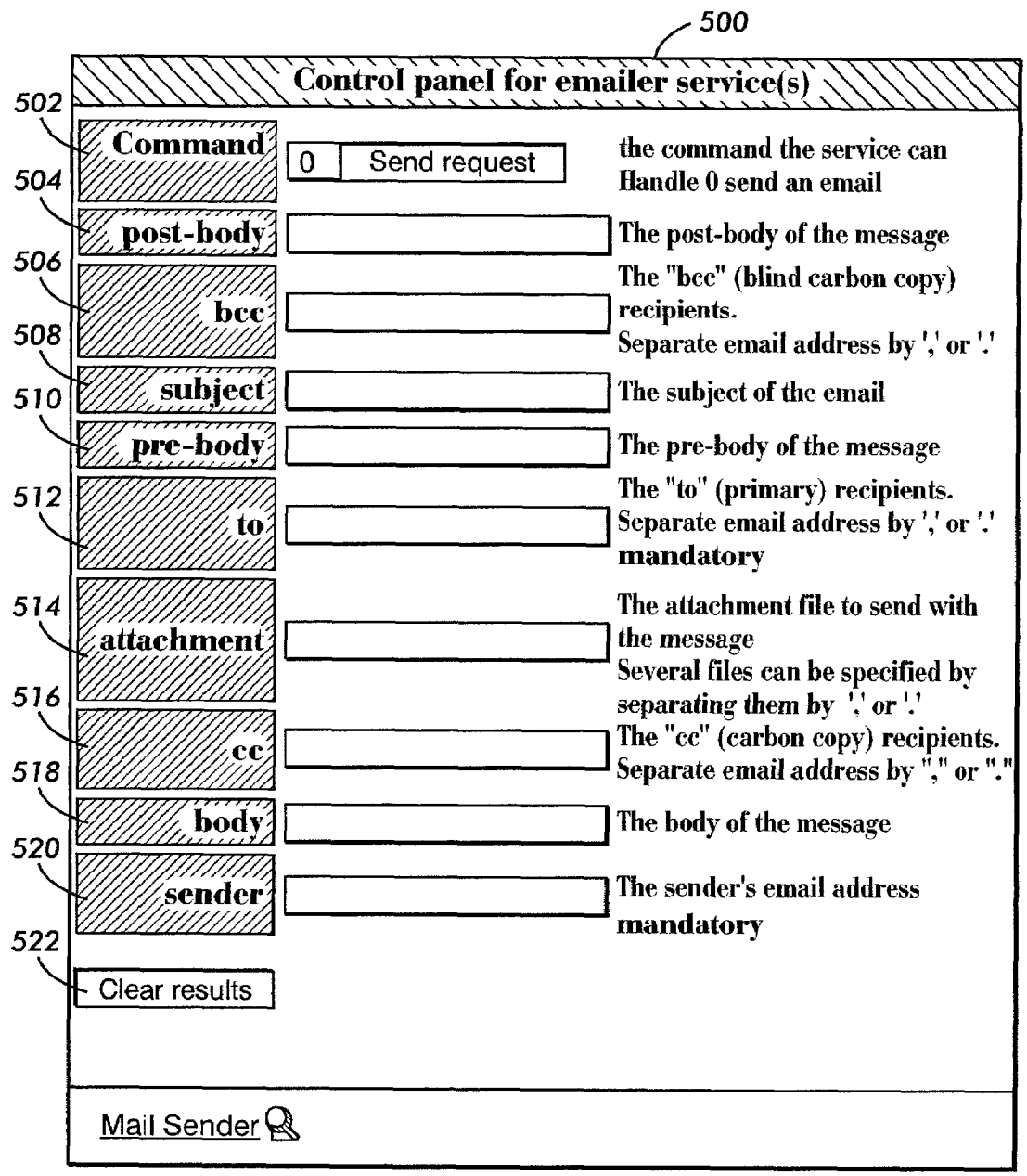
FIG. 4 is a control panel for an emailer service.
Figure 5:
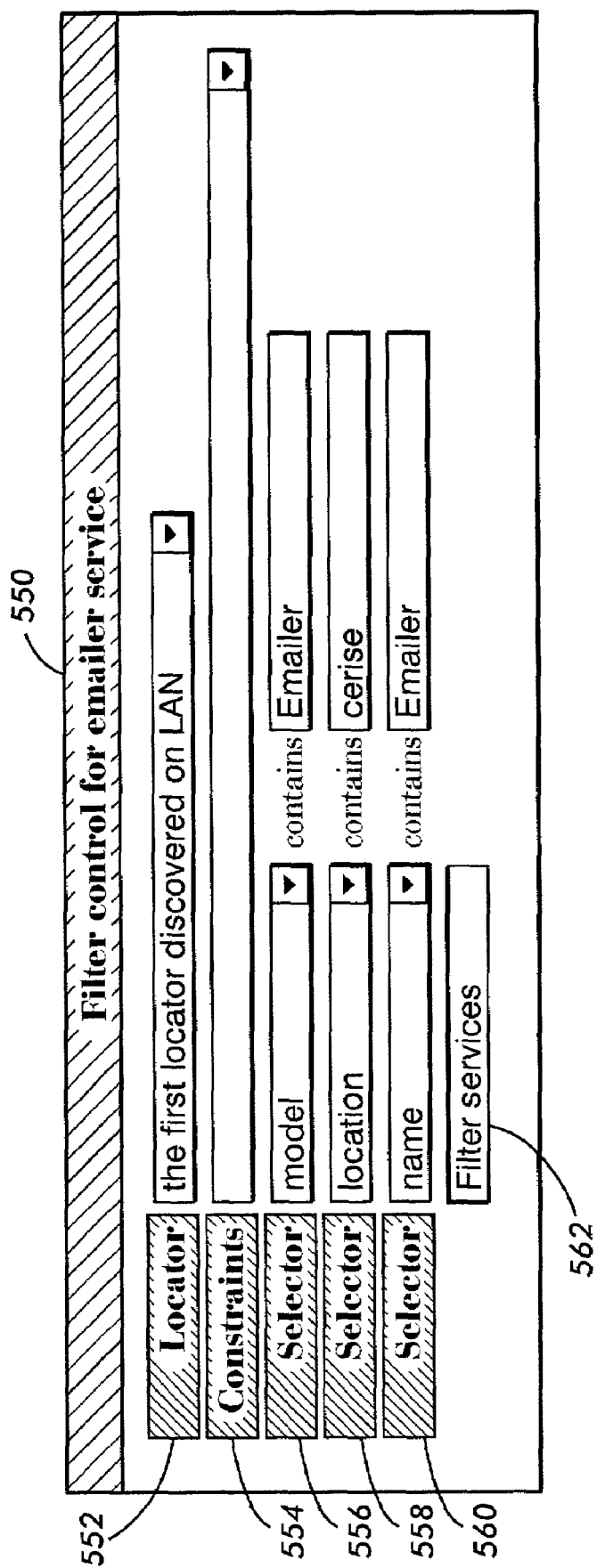
FIG. 5 is a filter control panel for an emailer service.
Figure 17:
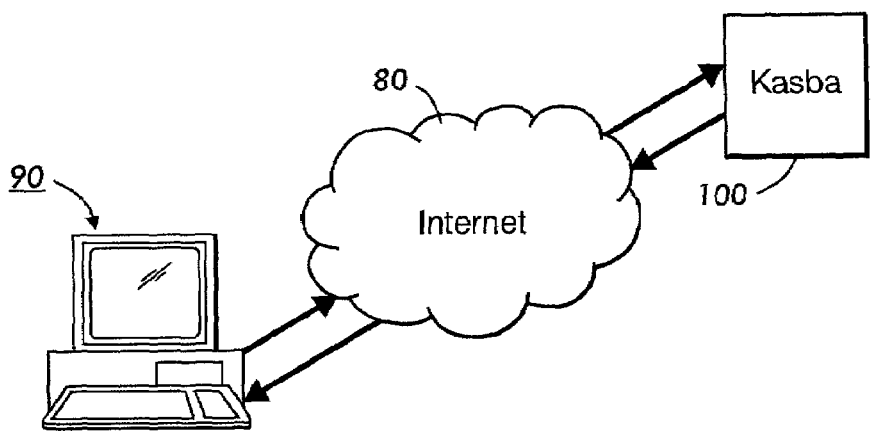
FIG. 17 is a block diagram of how the system of FIG. 1 would be implemented on a network.

The system 100 may be implemented on any network, such an internet, the Internet or an intranet. If, for example, implemented on the Internet 80, a user would access the system 100 through a work station or personal computer 90 with a user interface, such as a web browser (See FIG. 17). Upon accessing the system 100, the set of services available would be displayed. Referring to FIG. 2, a display of a group of services available for integration in system 100 is shown. In a web browser, the user can load a page and can see all the registered services. The available services displayed are: Mail Sender, Search Engine on computer/Zdnet, Search engine on general/OpenDirectory, Web Assistant, Terms extraction with strategies, Knowledge Pump Communities, Dictionary, SearchNRank, Various Kasba Facilities, Search engine on /france/AlloCine, Html Document editor, Docushare on docushare.grenoble.xrce.xerox.com, Document Language Identifier, Image Composer, Image Extractor, Document Categorizer, PdfConverter, Search engine on /general/Google, Document Souls Visualizer, DocuShare on lautaret.grenoble.xrce.xerox.com:1707, Terms Extractor, Knowledge Profiling, Knowledge Profile Repository and Document Summarizer. Each service contains a link for accessing each service directly. For example, when a user "clicks" on the link to Mail Sender, the functionality for Mail Sender: control panel (FIG. 4,) Filter Control (FIG. 5), Service Properties (FIG. 6) and Service Parameters Description (FIG. 7) would be displayed.

Figure 3:
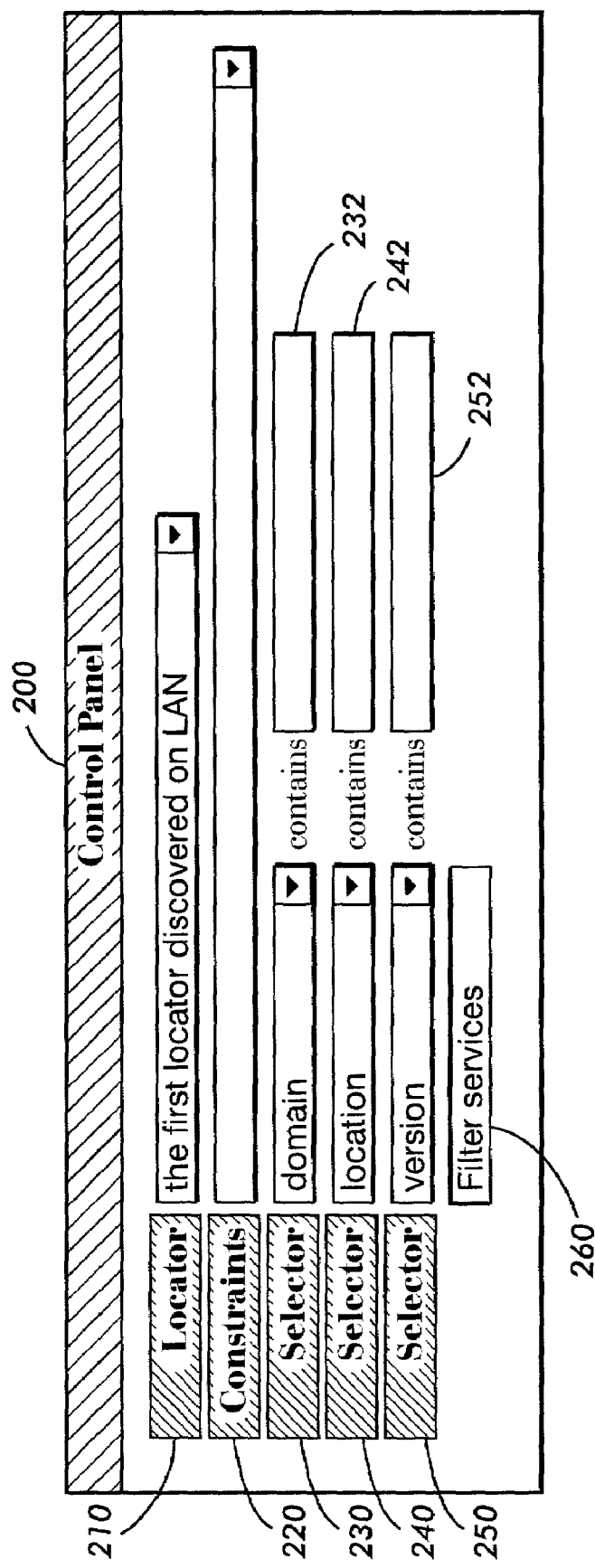
FIG. 3 is a filter control panel for selecting among the services in FIG. 2.

If the user does not wish to access any individual service directly, the user can proceed to use the lookup, discovery and filtering functionality. Also displayed on the web page is Filter Control 200 (see FIG. 3). Filter Control 200, while not necessary to operation of system 100, is a feature which helps a user select among a large number of services offering multiple functionality. Filter Control 200 contains several filters which the user may use in the process of selecting services to integrate. Filter Control 200 includes locator 210, constraints 220, selector 230, 240, 250, from which the user may select using keywords. For example, from locator 210, the user may select "the first locator discovered on the LAN", "all the locators on the LAN" or one of a specific identified location on the LAN. From constraints 220, the user may select particular name, domain, version, manufacturer, etc. Or the user may leave constraint 220 empty and search on all. From selector 230, 240, 250, the user may select domain, location, version, vendor, manufacturer, model, name, serial number from the pull down menu. The user can input keywords of his/her own choosing in box 232, 242, 252.

After the user completes the Filter Control 200, the user selected filter services 260 and the system filters and constrains, producing a result. The result will typically be one or more services, but may be the null set, depending on the filtering criteria selected. Once a non-empty result is achieved, the user may experiment with the resulting service(s), sending some input as documented and validating that the service corresponds to the user's need. Alternatively, the user may use the results to start creating a customized scenario.

Figure 12:
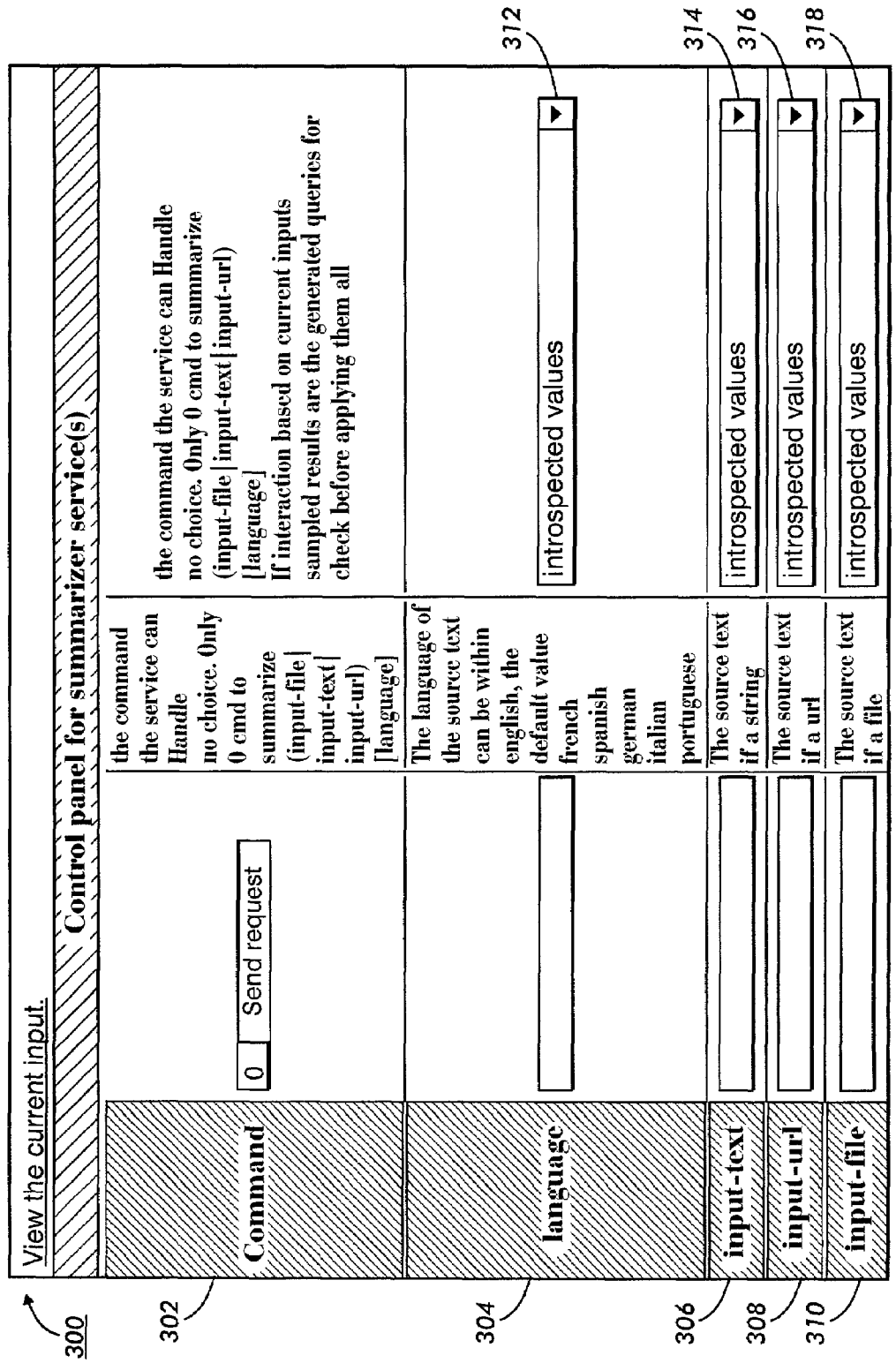
FIG. 12 is a control panel for a summarizer service.

Assume, for example, the user has a series of documents that need to be reviewed, summarized, a report written and sent to a client. No single service provides all these functions, so the user must use the system 100 to create a scenario which performs all of these functions. In FIG. 2, the user would first select and then access Document Summarizer by clicking on the link. The control panel 300 for Document Summarizer is then displayed to the user (see FIG. 12). The user selects "0" in command box 302 for send a request. In box 304, the user selects the language of the article to be summarized; the default is English, but French, Spanish, German, Italian and Portuguese may also be selected. Boxes 306, 308 and 310 enable the user to input the document or text to be summarized: box 306 for string text, box 308 for the URL of the document, box 310 for the file location if the document is a file (such as stored in a directory on the user's personal computer or work station). If the user changes his/her mind, box 320 "clear results" may be selected and all values input return to empty. Note that control panel 300 also includes pull-down menus 312 (language), 314 (text), 316 (URL), and 318 (files). The pull-down menus are used to display the output from a previous service. For example, if the user had selected "Search engine on/general/Google" as the first service, then the system will display the search results (output of Google) in the the appropriate pull-down menu.

Figure 13:
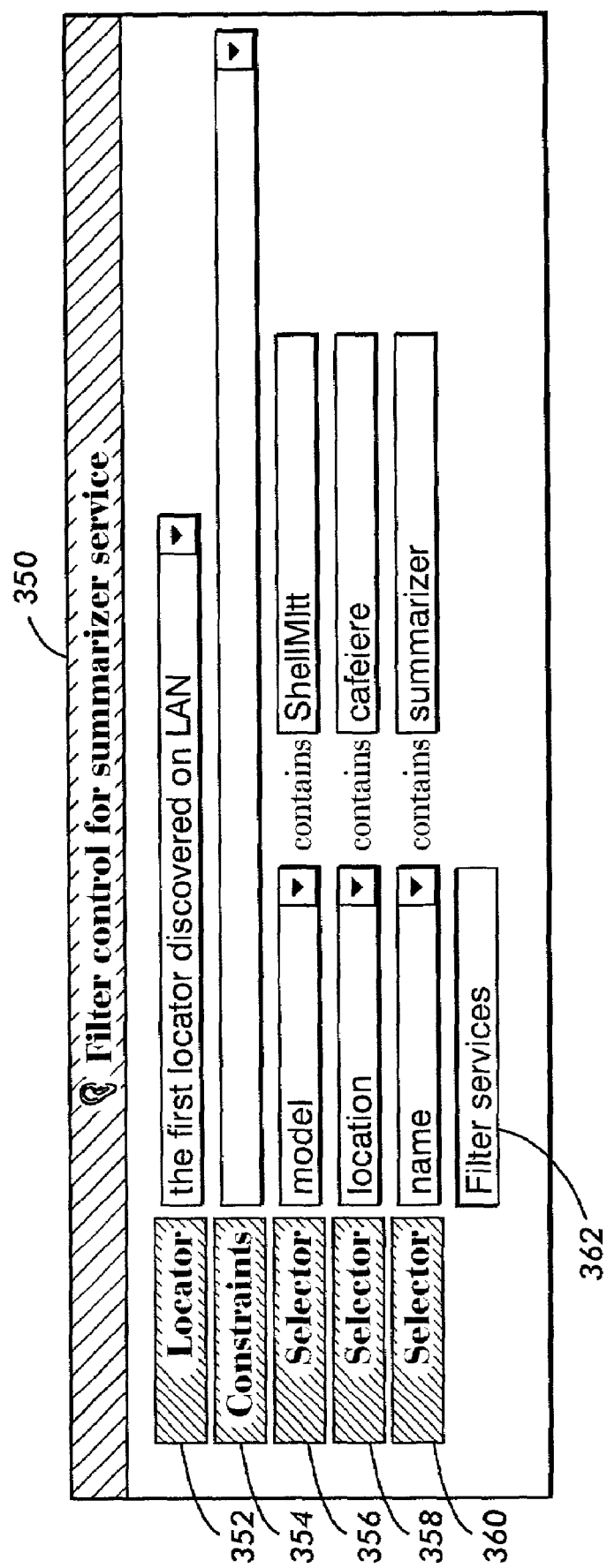
FIG. 13 is a filter control panel for a summarizer service.

The summarizer service contains its own filter control 350 (see FIG. 13) from which the user can filter and constrain the Document Summarizer functions. Filter control 350 contains similar selection boxes from which the user may filter and constrain the summarizer service: locator 352, constraints 354, selector 356, 358 and 360. Upon completion of the desired filtering, the user selects filter service 362. FIG. 14 lists the particular service properties for Document Summarizer and FIG. 15 lists the service parameters descriptions for Document Summarizer.

If the user is satisfied with his/her selections on the Document Summarizer service, he/she may provide input in the form of the documents to be summarized. Once the user inputs the documents to Document Summarizer, the output is a list of document summaries, one for each document. As part of the scenario creation feature of the system, system 100 will automatically suggest as input of the lastly selected service the output of the previous one. (Note also, that if there were multiple prior services in a scenario, any of the output from any of the prior services could be selected for the input to this service.) Users are free to use this input or put in their own input, or both. Going back and forward in the browser, the user accesses the step-by-step mode where each step corresponds to the invocation of a service.

Figure 8:
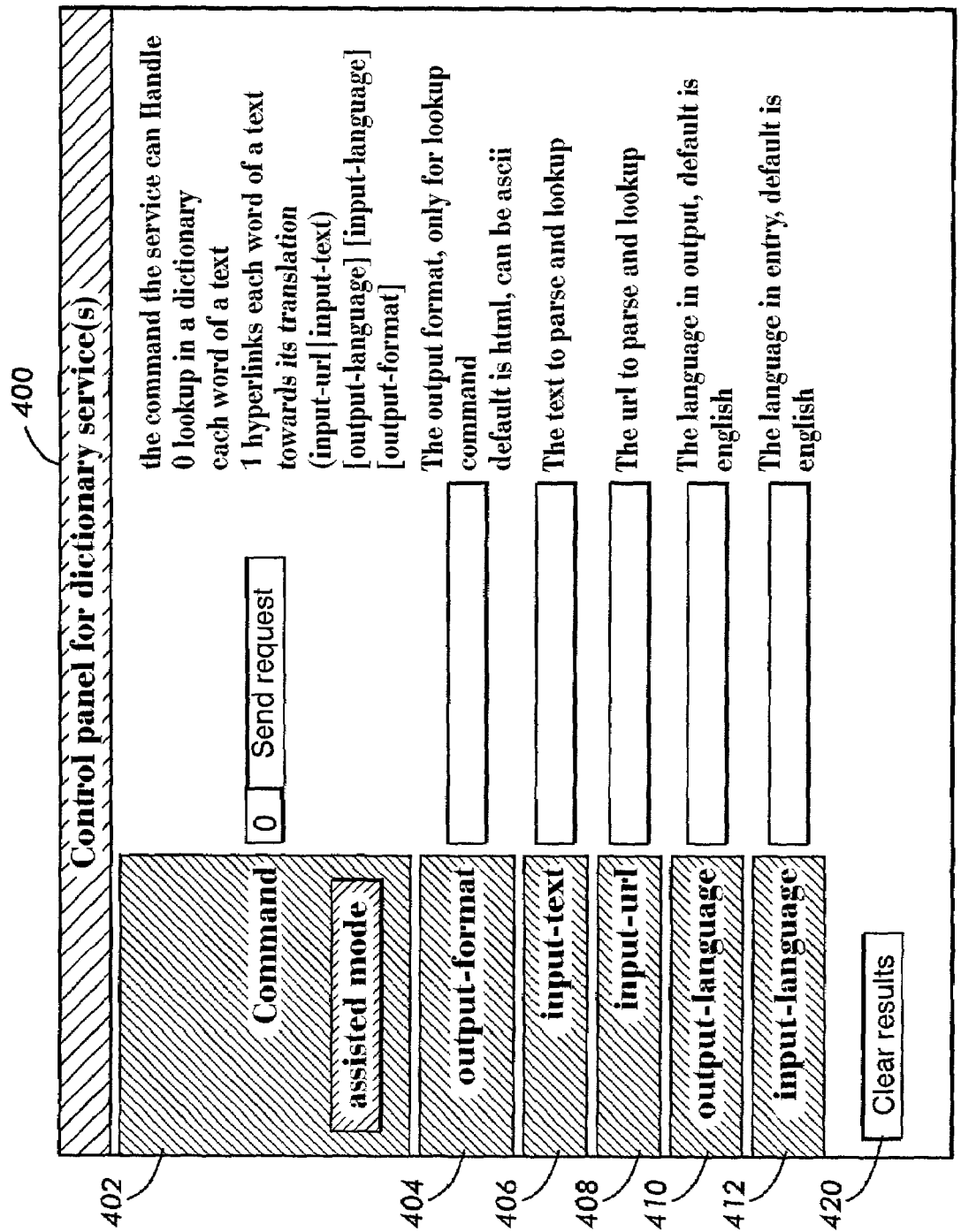
FIG. 8 is a control panel for a dictionary service.
Figure 9:
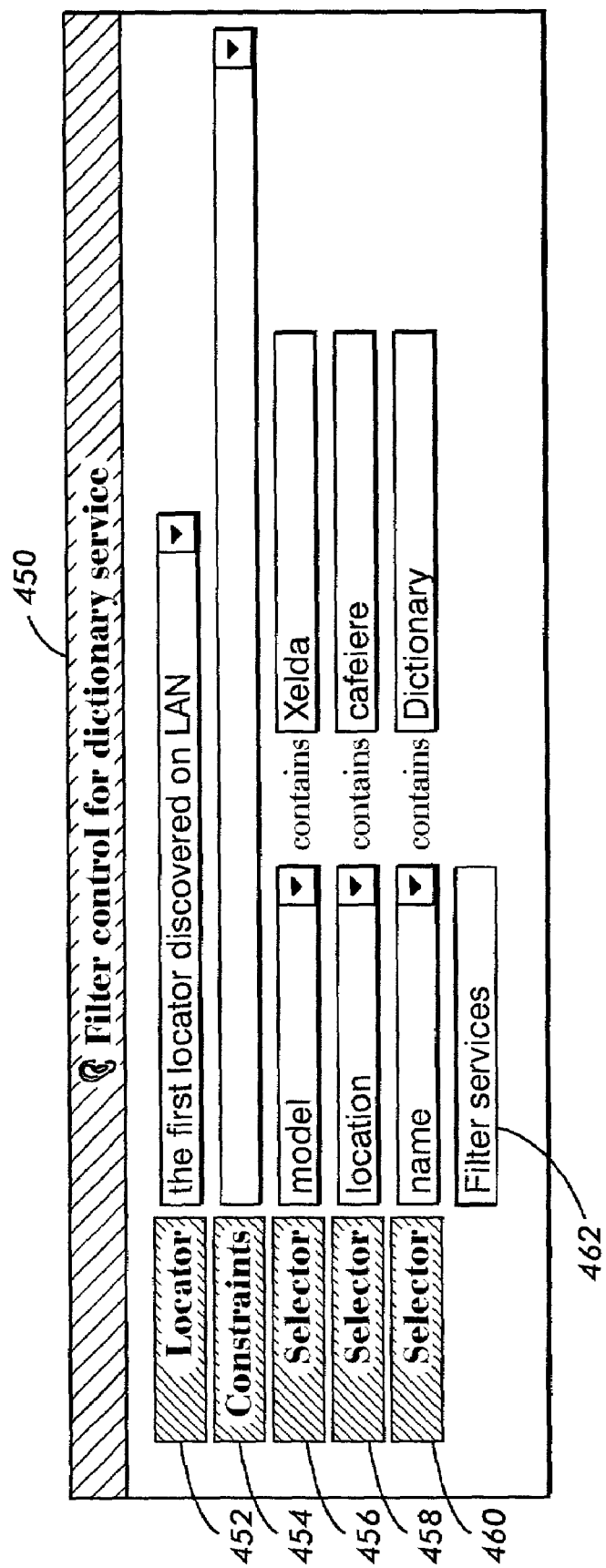
FIG. 9 is a filter control panel for a dictionary service.

Suppose the user submits several documents to Document Summarizer and Document Summarizer returns paragraph summaries of each. Suppose the user wishes to check the definition of some of the words in the summaries returned. The user can then submit the words to the dictionary service. While system 100 will (by the default setting) takes the output of the document summarizer service and pipes it into the input of the dictionary service, in this case the user may wish to lookup only a few words in the dictionary. When dictionary service is selected, control panel 400 (see FIG. 8) and filter control 450 (see FIG. 9) are displayed to the user.

Dictionary control panel 400 includes a command line 402 which includes two options: "0" for lookup each word of a text in a dictionary, and "1" for hyperlinking each work of a text towards its translation. Output format 404 enables the user to select text or html for the output. Text may be input via text using box 406 or a via a URL using box 408. Box 410 enables the user to select the language of the output. Box 412 enables the user to specify the input language. Box 420 enables the user to clear the results and start over. Note that control panel 400 may also include pull-down menus for providing the output of the summarizer service directly as input.

Filter control 450 similarly contains locator 452, constraints 454, selector 456, 458 and 460. The filter control 450 may be used to select the dictionary. Filter services 462 causes the dictionary service to return the definitions. FIG. 10 displays the service parameters for dictionary service and FIG. 11 displays the service parameters for dictionary service.

Once the user has checked definitions and completed the summary, the user may write his/her report. This may be done offline or by using an editor service (if one is provided). In this system, the only editor is HTML Document Editor. If that is acceptable for the user's requirements, the user may invoke that service, create a report, attach summaries and definitions. System 100 will pipe the output of the document summarizer and the dictionary into the input of the HTML document editor, as well as the input provided directly by the user. The user then decides to send the report to a distant colleague. The user invokes the Mail Sender.

System 100 takes the output of the HTML document editor and pipes it into the attachment section of the Mail Sender. When the Mail Sender is selected, control panel 500 (see FIG. 4) and filter control 550 (see FIG. 5) are displayed. Control panel 500 includes command line 502 for sending an email, box 504 for inputting the text of a message, box 506 for listing any blind copy recipients, box 508 for listing the subject of the email, box 510 for listing the prebody of the message, box 510 for inputting the "to" recipient of the email, box 514 for inserting attachments, box 516 for listing copy recipients, box 516 for listing the body of the message, box 518 for listing the sender of the email. Box 522 clears all input data. Filter control 550 includes locator 552, constraints 554, selectors 553, 558 and 560. Box 562 selects filter services. FIG. 6 lists the service properties for Mail Sender and FIG. 7 lists the service parameters description for the Mail Sender.

Figure 16:
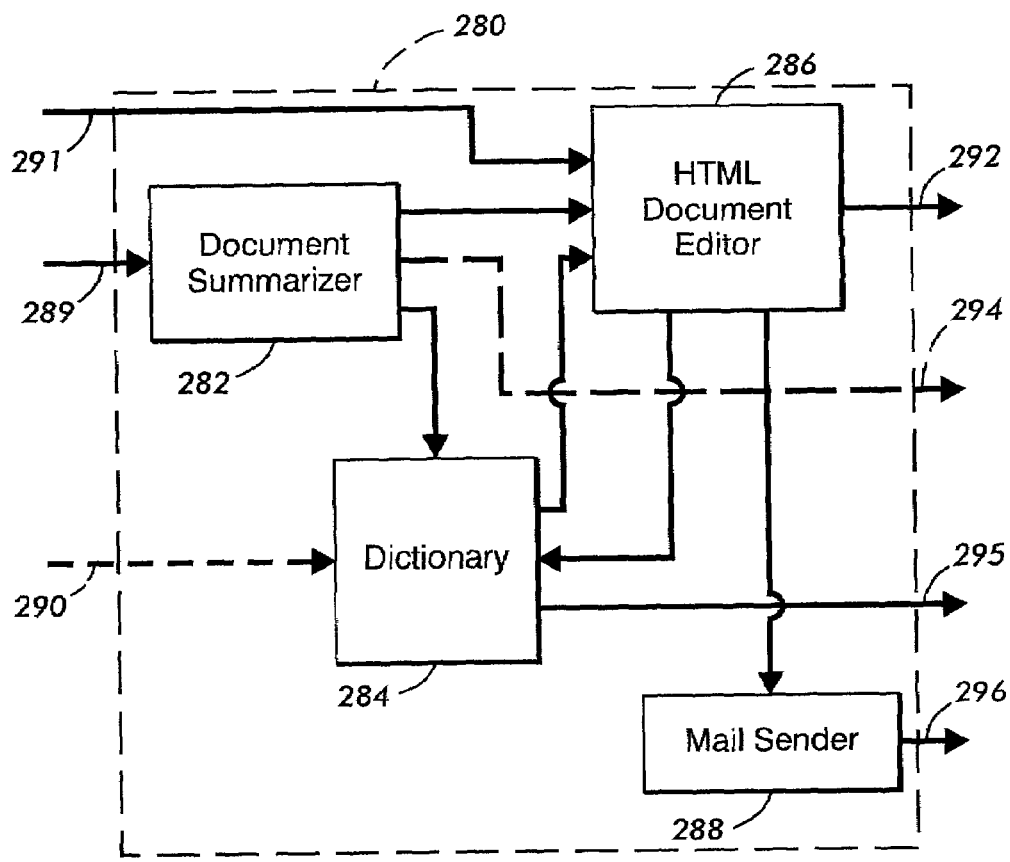
FIG. 16 is a block diagram of an exemplary scenario built using the system of FIG. 1.

The user has created a scenario which is a combination of document summarizer, dictionary, HTML document editor and mail sender all piped together in accordance with the user's criteria. Referring to FIG. 16, the resulting scenario 280 includes document summarizer service 282, dictionary service 284, HTML document editor service 286 and mail sender service 388. In this scenario, the user has optionally selected three inputs: input 289 for inputting documents to be summarized; input 290 for inputting words to the dictionary; input 291 for inputting text to HTML document editor. In addition to user input 290, dictionary 284 is configured to receive input directly from the output of document summarizer 282 and HTML document editor 286. In addition to user input 291, HTML document editor 286 is configured to receive input from the output of document summarizer 282 and dictionary 284. In scenario 280 the only input provided to mail sender service is the output of HTML document editor 286. However, the user could come back at a later date and modify scenario 280 to provide additional inputs to the various services or remove those not needed. Scenario 280 has four outputs: the output 292 from HTML document editor 286, output 294 from document summarizer 282, output 295 from dictionary 284, and output 296 from mail sender 288. When the user is happy with scenario 288, he/she may bookmark it. Reloading the bookmark instantiates the execution of the whole row of services.

Designing, implementing and testing a scenario involving several components today are a highly time consuming exercise. Consequently, software engineers tend to reduce the time they spend for these stages when the project is not big enough, with some risks to freeze a solution that is not a good one because of rapid decisions, and often the risk not to satisfy the customer requirements at the end. Another consequence is the need to have big enough projects to invest on, because the cost of all these preliminary stages cannot be paid otherwise. By using the system and method of the invention, the software engineer (and even the final user) can discover, experiment and link services in few minutes. It becomes very natural to change the scenario until a satisfactory solution is found. Changing one component to another can be done as many times as necessary. Software components may be easily added to the system. Indeed, users may suggest that additional components be added. Or, some of the user created scenarios may be added to the system.

There are several ways to use the system to discover available services. For example, the user may browse in a kind of forest, where services are classified according to several perspectives, knowing that the same service can be reached via different paths. This user can also provide a (set of) keyword(s) to search for specific services. Then all the services compatible with these keywords are listed. As soon as these services are found to be compatible, an interface to test these services is provided to the user. This interface allows the user to invoke several services at the same time, if the services are close to one another.

In this case the interface is the intersection of the respective interfaces, and it is presented as soon as it covers all the mandatory parameters for the respective services. For example, to perform several searches on different sources in parallel, one may enter "search" as a keyword. This automatically selects several wrappers, with a form allowing the user to invoke all of them. Basically the only mandatory parameter for a search is the string the user wants to search, so it will be a parameter required in the form. The more precise the service description, the more limiting the set of compliant services, and the more the user can specify a larger set of parameters which can be used for all the selected services. Assume a user wants to interact with a single service. The user can specify all parameters available for the service. Now assume the user wants to interact with two services using the same parameters. The user can specify only those parameters that are common to both services. Using the same example, if the user restricts the search to Google, the user has access to more parameters than searching on Google, AltaVista and Excite at the same time.

An aspect of the invention is the ability to share and replay registered scenarios. A scenario is an integrated set of services. If the system administrator registers the scenario on the system, other users can replay the registered scenario. Alternatively, the system administrator may permit a user to register scenarios only for his/her own use later. When a user is happy with a scenario, the user can store it. Then the registered scenario can be replayed it in two modes; the first mode is executing it in one shot, while the second mode is a step-by-step mode. Using the second mode, the user can decompose a scenario, clicking on the back and forward buttons in the user interface. This technique can be used to debug scenarios as well as to learn by examples. This is particularly true for the users who are not the author of the scenario.

Using a debug mode, it is easy to develop and extend an existing scenario. The system can be used by several users, each authoring a part corresponding to her/his competencies, jointly creating a collaborative work.

Another aspect of the system is that composite scenarios may be built. Just as one service may be embedded in another, one scenario may be embedded in another, resulting in very complex scenarios. A library of scenarios could be developed and could be used on demand.

To facilitate the building of composite scenarios, a structured repository where scenarios are stored and managed may be incorporated in the system. This structured repository can be used as a place to capture a memory of practices and scenarios, which can be explored each time someone needs to design and deploy a new scenario. A recommender service could be combined with the system (if a recommender service is not one of the offered services) to submit, comment and recommend scenarios to the community of users. This could be beneficial for solution designer or software integrator groups, where it is often difficult to capture and build on top of previous realizations.

An aspect of the invention is that the system and method of integrating services is that it supports the discovery, interaction and chaining of services into scenarios, and the execution of scenarios to demonstrate a global behavior. This functionality could be provided as a two-level structure or a single level structure. For example, a scenario builder would address the first phase: services discovery and scenarios scripting; and a "player" addresses the scenario execution.

By implementing the system as a two-level structure, the different requirements of the different types of users of the system may be addressed. For example, using the two-level concept, a software integrator could use the builder to design the scenario corresponding to the final user requirements, before presenting the scenario (in the form of a "player") to the customer who will validate the result. The "player" user interface could be simplified and polished, while keeping the possibility of capturing the user parameters, and possibly to provide interaction options depending on the considered scenarios. Taking the example of an information search, the user should indicate the terms to be searched. Then, using a form, the user could check some boxes corresponding to the search results he/she wants to be reprocessed and for example summarized for an insertion in a report document.

The framework 20 need include only what is required from a service, a service description language, introspection, interaction in order to be a part of the system. Existing software frameworks may be extended with the system of the invention. For example, e-speak, UDDI (Universal Description, Discovery and Integration: a Web-based distributed directory that enables business to list themselves on the Internet and discover each other, similar to a traditional phone book's yellow and white pages), SOAP (Simple Object Access Protocol provides a way for applications to communicate with each other over the Internet, independent of platform. SOAP relies on XML to define the format of the information and then adds the necessary HTTP headers to send it) may be extended by the invention to provide discovery, interaction and scripting capabilities. Because the invention requirements in terms of framework are minimal, it will generally be easy to augment an existing integration framework, such as e-speak, with these functionalities.

In addition to services such as software components, devices such as printers, facsimile machines, etc. may be plugged into the system in the same way as software services. Also, the integration of third party services and devices (e.g., phone), in complement to other internal services such as document.com or the Community Wall may be added to the system.

The system and method of the invention integrates the three phases necessary (and requiring significant effort) when using e-speak web access (and UDDI): discover existing services by browsing; build a request corresponding to a call: most of the time, consist in writing an XML document valid in the discovered schema, that represents one interaction with a service; and write a client application that chains tested interactions.

DSDIF and the invention are complementary, and may be integrated together. The invention typically supports discovering which services are available, adding a new service, testing how it can be integrated with other services, as well as designing and validating some scenarios. DSDIF can be used to build a "production software", with robustness, strict semantics and proved performances. An analogy can be made, considering DSDIF as another framework on other bus(es), this set constituting an operating system for programming. The user is a programmer who reads the specifications and produces code for using a set of services in a scheduled sequence. When a given service makes some sense for an end-user, it could provided (using the invention) to view, interact with and chain features on top, similar to providing a set of commands on top of a subsystem. To do that, the DSDIF service must conform to the framework of the invention. Then the prototyping at functional level can be done by interactively scripting, before coding the application within SIF.

In general, it is anticipated that only a limited effort will be required to add a service to the system, corresponding to write a "main" function and document the service. However, the effort to plug-in a service depends on the nature of the service itself. If the service is a basic input/output stream, let say equivalent to a UNIX command, the effort corresponds to less than an hour of work. If the service has a complex API such as Docushare, it can take one week or more to get the right plug-in.

In the example of the invention which implements a system for a knowledge management customer, it may be important to provide a knowledge profile service. This service is useful because it provides a comparable representation for non-homogeneous data. Without constraining data models, it provides a way to compare most data, as long as there is a dedicated feature to profile a data published by a service. This can be seen as the basic knowledge metadata, or eventually a cast operation.

The knowledge profile service provides knowledge profiles for documents, users, communities of interest and web sources (e.g., Open Directory). The knowledge profile is based on the textual data associated with the profiled object. Therefore it is orthogonal to e.g., demographic profiles about a user or document meta-data. The current knowledge profile associated with an object is a set of term-weight vectors. Knowledge profiles can be compared in order to measure their similarity in terms of information content/interest. The knowledge profile service provides two families of functionality. First, an operations interface permits searching for knowledge profiles of specific objects as well as comparing/ranking them against others. Second, a registration interface permits knowledge profile providers to add new or update existing profiling information (aka term-weight vectors) of profiled objects.

A knowledge profile service also provides a contextual filtering algorithm. One of the problems with knowledge services is the number of potential results for an operation. Retrieving documents from a search or from a repository is not limited by the number of results. Chaining such operations leads quickly to an exponential tree in which some filtering is needed. Providing the right generic filtering is impossible most of the time for a programmer. The right filtering depends on the user, or on a community. So applying the rank feature of a knowledge profile service against the context to consider, before cutting less relevant branches is often the most appropriate, generic and low-coast filtering technique.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A computer implemented interactive method of integrating and customizing document-based services in a knowledge management system, comprising:

providing a plurality of document-based services, wherein each document-based service comprises a software component associated with the system and provides at least one functionality for processing at least a portion of a document;

wherein each software component includes a control panel for defining and inputting commands, input parameters and output parameters associated with the software component;

wherein input parameters comprise a document-based string parameter;

displaying the plurality of document-based services in a user interface, wherein each document-based service has a link associated with it for accessing the document-based service directly;

responsive to user selection of a first document-based service from the plurality of document-based services, displaying the first document-based service's control panel in the user interface;

responsive to user input of at least one command and at least one input parameter in the control panel of the first document-based service, caching any results objects for further usage within a session memory, displaying any output generated by the document-based first service in the user interface, and providing handles to specify paths to the results objects within the session memory;

responsive to user selection of a second document-based service from the plurality of document-based services, displaying the second document-based service's control panel in the user interface; and responsive to user selection of at least a portion of the output generated by the first document-based service, at least one command and at least one input parameter in the control panel of the second document-based service, piping the at least a portion of the output generated by the first document-based service to the selected input parameter of the second document-based service and displaying any output generated by the second document-based service in the user interface.

2. The method of claim 1, further comprising:

responsive to user selection of a third document-based service from the plurality of document-based services, displaying the third service's control panel in the user interface; and responsive to user selection of at least a portion of the output generated by the second document-based service, at least one command and at least one input parameter in the control panel of the third document-based service, piping the at least a portion of the output generated by the second document-based service to the selected input parameter of the third document-based service and displaying any output generated by the third document-based service in the user interface.

3. The method of claim 1, further comprising:

responsive to user selection of a fourth document-based service from the plurality of document-based services, displaying the fourth service's control panel in the user interface; and responsive to user selection of at least a portion of the output generated by the first document-based service, at least one command and at least one input parameter in the control panel of the fourth document-based service, piping the at least a portion of the output generated by the first document-based service to the selected input parameter of the fourth document-based service and displaying any output generated by the fourth document-based service in the user interface.

4. The method of claim 1, wherein the user interface comprises a browser and wherein each link comprises an http path from the browser to its corresponding service.

5. The method of claim 1, further comprising:
provide a filter control comprising a plurality of selectable criteria, wherein the criteria refer to conditions defined for each of the document-based services;
responsive to user selection of at least one criteria in the filter control;
executing the filter control and displaying any results, wherein the results comprise a subset of the plurality of document-based services.

6. The method of claim 1, wherein the plurality of services comprise a hyperbolic tree view builder, a mail sender, a PDF converter, a search engine, a document summarizer, a database, a term extractor, a terms extractor, a translator, an image extractor and a dictionary.

7. The method of claim 1, wherein each document-based service includes a filter control for selecting criteria pertaining to the document-based service.

8. The method of claim 1, wherein the output parameters comprise at least one of a string, a document URL and a document pointer.

9. the method of claim 1, wherein the control panel defines the document-based service's functionality and service properties.

10. A computer implemented interactive system for integrating and customizing document-based services in a knowledge management system, comprising:
a plurality of document-based services, wherein each document-based service comprises a software component associated with the system and provides at least one functionality for processing at least a portion of a document;
wherein each software component includes a control panel for defining and inputting commands, input parameters and output parameters associated with the software component;
wherein input parameters comprise at least one of a string, a document URL and a document pointer;
a user interface for displaying the plurality of document-based services, wherein each document-based service has a link associated with it for accessing the document-based service directly;
responsive to user selection of a first document-based service from the plurality of document-based services, displaying the first document-based service's control panel in the user interface;
a first framework, responsive to user input of at least one command and at least one input parameter in the control panel of the first document-based service, for displaying any output generated by the first document-based service in the user interface;
a second framework, responsive to user selection of a second document-based service from the plurality of document-based services, for displaying the second document-based service's control panel in the user interface; and
a scripting shell, responsive to user selection of at least a portion of the output generated by the first document-based service, at least one command and at least one input parameter in the control panel of the second document-based service, for piping the at least a portion of the output generated by the first document-based service to the selected input parameter of the second document-based service and displaying any output generated by the second document-based service.

* * * * *